United States Patent [19]

Sintes

[11] 4,274,712
[45] Jun. 23, 1981

[54] SOLAR RADIATION REFLECTORS ADAPTED TO TRACK THE INCIDENT RAYS OF THE SUN

[75] Inventor: Julio F. Sintes, Madrid, Spain

[73] Assignee: Sener, Ingenieria y Sistemas, S.A., Spain

[21] Appl. No.: 3,720

[22] Filed: Jan. 24, 1979

[51] Int. Cl.³ .............................................. G02B 7/18
[52] U.S. Cl. ................................................... 350/299
[58] Field of Search .................... 350/292, 299; 353/3; 126/438, 439; 248/487

[56] References Cited

U.S. PATENT DOCUMENTS

| | | | |
|---|---|---|---|
| 514,669 | 2/1894 | Allingham | 126/438 |
| 1,946,184 | 2/1934 | Abbot | 126/438 |
| 2,133,649 | 10/1938 | Abbot | 126/438 |
| 3,847,136 | 11/1974 | Salvail | 126/438 |

FOREIGN PATENT DOCUMENTS 2354590  1/1978  France ...................................... 350/292

Primary Examiner—Jon W. Henry
Attorney, Agent, or Firm—Ostrolenk, Faber, Gerb & Soffen

[57] ABSTRACT

A tracking solar radiation structure which includes a main support column and a plurality of secondary structures mounted on the main column with a series of reflecting surfaces on the secondary structures. The bearing column extends in an inclined plane and is rotatable about its axis. The secondary reflector structures are articulatedly connected to the bearing column and adapted to swing with respect to the bearing column around the axis of articulation. The bearing column is supported at its lower end on an appropriate base and at a section above its mid-point by a substantially flat structure perpendicular to the axis of rotation of the bearing column.

7 Claims, 5 Drawing Figures

SOLAR RADIATION REFLECTORS ADAPTED TO TRACK THE INCIDENT RAYS OF THE SUN

The present invention relates to improvements in solar radiation reflectors which may be used in particular for the production of energy by means of heliothermal plants.

The expression "solar radiation reflector" applies to a system capable of intercepting a direct beam of solar radiation and reflecting it with great precision in a predetermined fixed or movable direction.

The expression "solar radiation reflector" also applies in the present specification to the apparatus known as "heliostats," in which the direction of the reflected rays is maintained fixed, within a permissible error, with respect to the support space of the heliostat, upon variation of the position of the sun in its apparent course over the local firmament.

The idea of reflecting incident solar radiation on an assembly of surfaces in such a manner that the beams of radiation are concentrated on a more reduced area in order to obtain high flows of heat is very old. The story is known of the ancient Greek Archimedes who succeeded in burning the sails of invading Roman warships by concentrating on them the solar radiation reflected by the polished shields of the Athenian soldiers. The present concept, known as heliothermal power plant with central receiver is based on the same principle. An assembly of a plurality of heliostats distributed on land exposed to the radiation of the sun reflects the intercepted radiation and concentrates it on a receiver where high heat flows are obtained.

During the last five years as a result of the increase in the price of oil, new impetus has been given to research and projects directd at utilizing the energy of the sun for the industrial production of thermal and electrical energy, and in particular heliothermal electric power plants with central receiver. The production of electrical energy by these plants is still in the phase of technological development. The fundamental design problem present is the reduction of costs, in order to reach a competitive commercial level.

The main percentage of the total cost of a solar plant with central receiver corresponds to the collection field formed of the heliostats or systems reflecting solar radiation, so that it is of obvious interest to develop improvements directed at improving the design of said reflectors.

The reasons which have made the development of an economic design of heliostats difficult are discussed below, since it is the solution of these problems which characterizes the improvements forming the object of the present invention.

Essentially every heliostat is formed of one or more reflective surfaces of large area, on the order of 30 to 50 square meters total, pivoted with two degrees of freedom of swing on a structural support anchored to the ground by a foundation.

The amplitude of movement of the reflective surfaces which is required in order to follow the movement of the sun considerably limits the free area where it is possible to locate the mounting structure without interference with said reflector surfaces.

As a result of this geometrical condition, most of the designs developed up to the present time for heliostats employ, as mounting structure, a vertical pedestal anchored with overhang to the ground by a foundation footing. The drawback of this overhung configuration is its poor intrinsic rigidity with respect to the high horizontal forces due to the wind which acts on a heliostat. In order to obtain the required rigidity with an overhung mount it is necessary to use heavy and expensive pedestals and foundations, since for a deflection at the fixed end the rigidity of an overhang is proportional to the cube of its length.

Summarizing, the heliostat systems of pedestal type known up to the present time do not constitute satisfactory systems due to their low intrinsic rigidity inherent in their design and configuration.

One of the purposes of the present invention is to provide a heliostat reflector system of high intrinsic resistance to the action of the wind.

Another purpose of the present invention is to obtain a heliostat reflector system in which the structure for anchoring the system to the ground is light and economical.

The reflector of the invention comprises, as is traditional in this type of apparatus, a load-bearing structure or column, a plurality of secondary structures mounted on said main column and a series of reflector surfaces mounted on the said secondary structures.

In accordance with the improvements which form the object of the present invention, the bearing column is mounted in an inclined position with respect to the local horizontal plane. The column has the ability to swing freely around its geometric axis. A drive mechanism being provided which is capable of fixing the position of the column in any position around the said axis.

In order to obtain this arrangement and free turning, the main column is mounted between two supports, one located at the lower end of said column and the other at an intermediate point thereof, preferably at a point on its upper half.

The first said support is anchored directly to the ground by a rigid structure. The second said support on its part is supported by a flat structure anchored at the bottom to the ground and located in a plane substantially perpendicular to the axis of rotation of the column.

The second intermediate support of the bearing column is formed of a ring mounted around said column, with the interposition of bearing-race elements. The ring bears a spindle which extends in direction perpendicular to the axis of the said ring in secant position to same in such a manner that it meshes with a ring-gear which is rigidly secured to the supporting column. The above-mentioned drive mechanism is connected to this spindle in such a manner that by actuating it in one direction or another there is produced the turning of the main supporting column around its axis in one direction or another.

The aforementioned ring which constitutes the intermediate support is supported by the above-mentioned flat structure. This flat structure may be formed, for instance, of two posts which form a given angle with the vertex on the intermediate support, these posts being anchored to the ground at their lower end.

The flat structure may also be formed of a single post which is resistant to compression and braced laterally by a plurality of tie rods which are resistant to traction. This post is located in a plane located substantially in the vertical plane which contains the main bearing structure. As in the preceding case, the post is anchored to the ground at its lower end and the tie rods form an angle with said post and are also anchored to the ground at their lower ends by adjustable turnbuckles.

In accordance with another feature of the invention, the secondary structures are articulated to the main supporting column and have the ability to turn around the axis of articulation with said column. For the actuating of these secondary structures a second drive mechanism is used.

In addition, the secondary structures which serve as support for the reflecting surface are counterbalanced statically by masses located in such a manner that the gravitational moments of the weight itself of said secondary structure around its axis of articulation on the main bearing structure are minimum.

All the characteristics set forth as well as other characteristics inherent in the invention will become more clearly evident from the following description read with reference to the accompanying drawings, in which one possible form of embodiment given by way of non-limitative example is shown. In the drawings.

Figure 4:
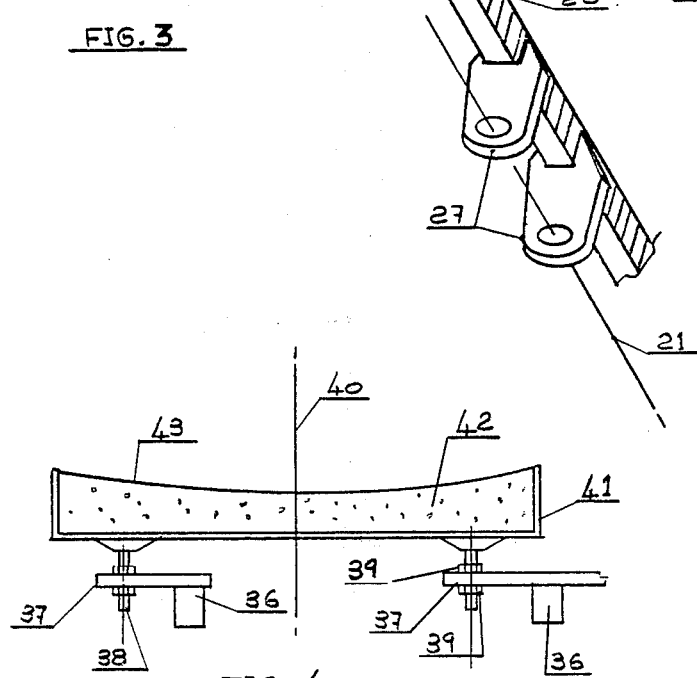

FIG. 4 corresponds to one possible embodiment of the mounting of the reflective surfaces.

Figure 1:
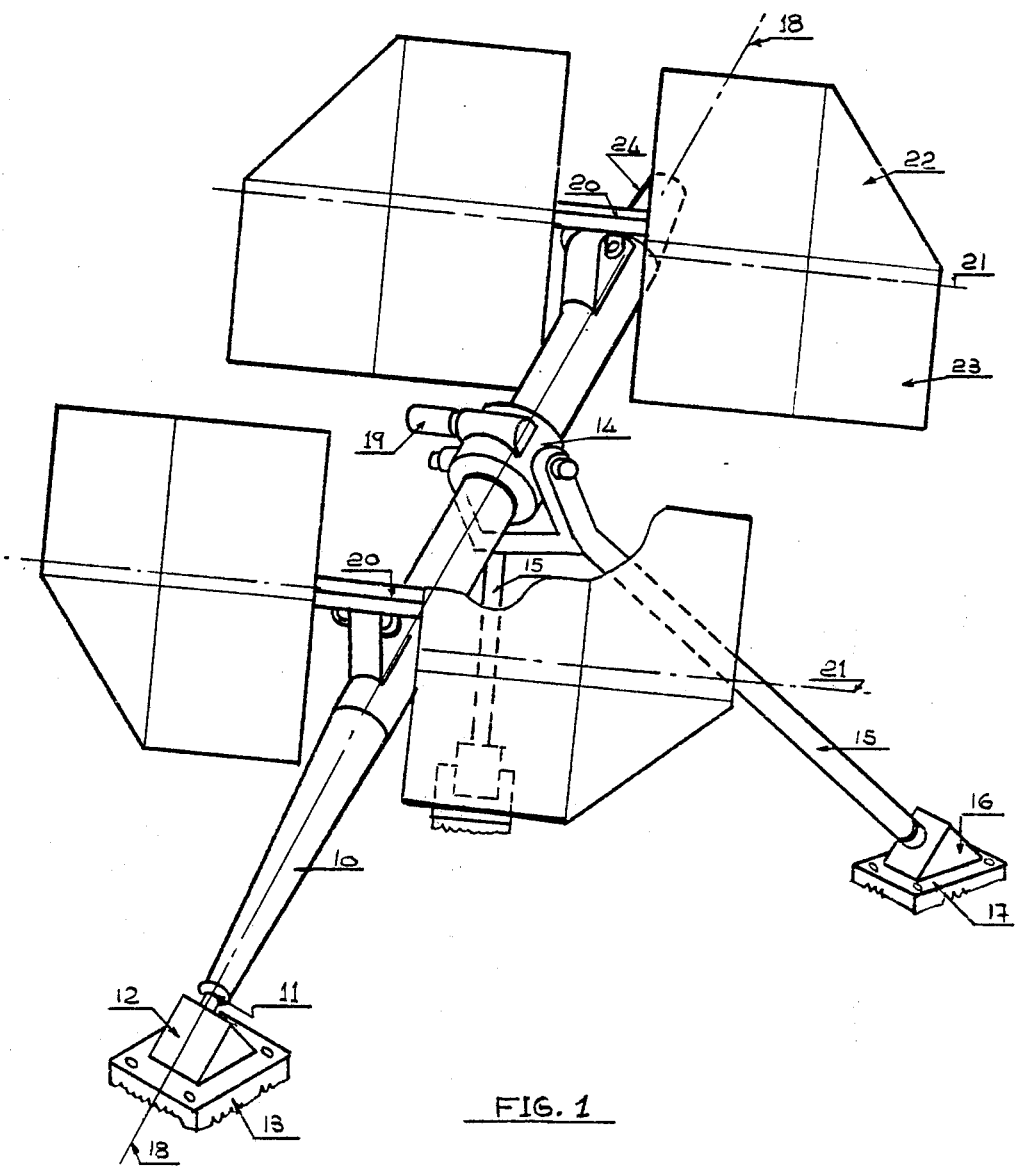
FIG. 1 is a perspective view of a solar radiation reflector constructed in accordance with the invention.
Figure 5:
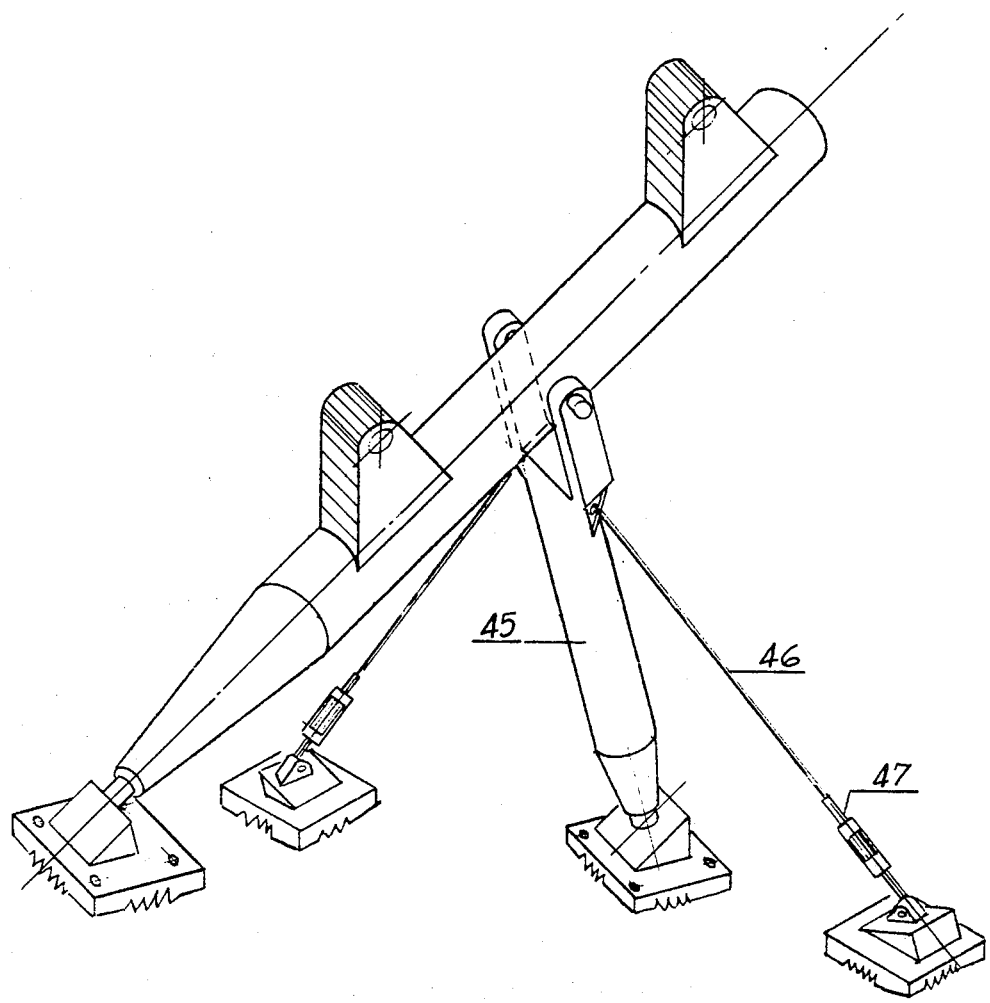

FIG. 5 shows a variant embodiment of the reflector as compared with FIG. 1.

In all of these drawings the same reference number is used for each part in the different figures.

As shown in FIG. 1, the solar radiation reflector system forming the object of the patent is formed of a main support tube 10 supported at its lower end in a knuckle or articulation 11 supported by an anchoring structure 12 fastened to a foundation shoe 13 resting on the ground. In its upper half the tube is articulated by bearings, or similar support, on a frame 14 supported by two posts or props 15 located in a plane substantially perpendicular to the axis of the tube 10 and anchored firmly to the ground by anchoring structures 16 and shoes 17.

The support tube 10 can turn around its longitudinal axis 18 the swing axis, actuated by a ring-gear and worm mechanism or the like located within the ring 14 and moved by a motor reducer 19.

On the support tube 10 there are pivoted two spars 20 which can turn around axes 21 parallel to each other and perpendicular to the axis 18. The spars 20 can rotate around their axes 21 jointly due to a mechanical connecting-rod connection located within the tube 10, or a similar mechanism.

The spars 20 serve as support for the reflector petals 22 formed of a plurality of mirror facets 23 mounted on a structural support.

The position of swing of the petals 22 around the pitch axes 21 is determined by an actuator situated within a frame 24 located at the upper end of the tube 10.

Figure 2:
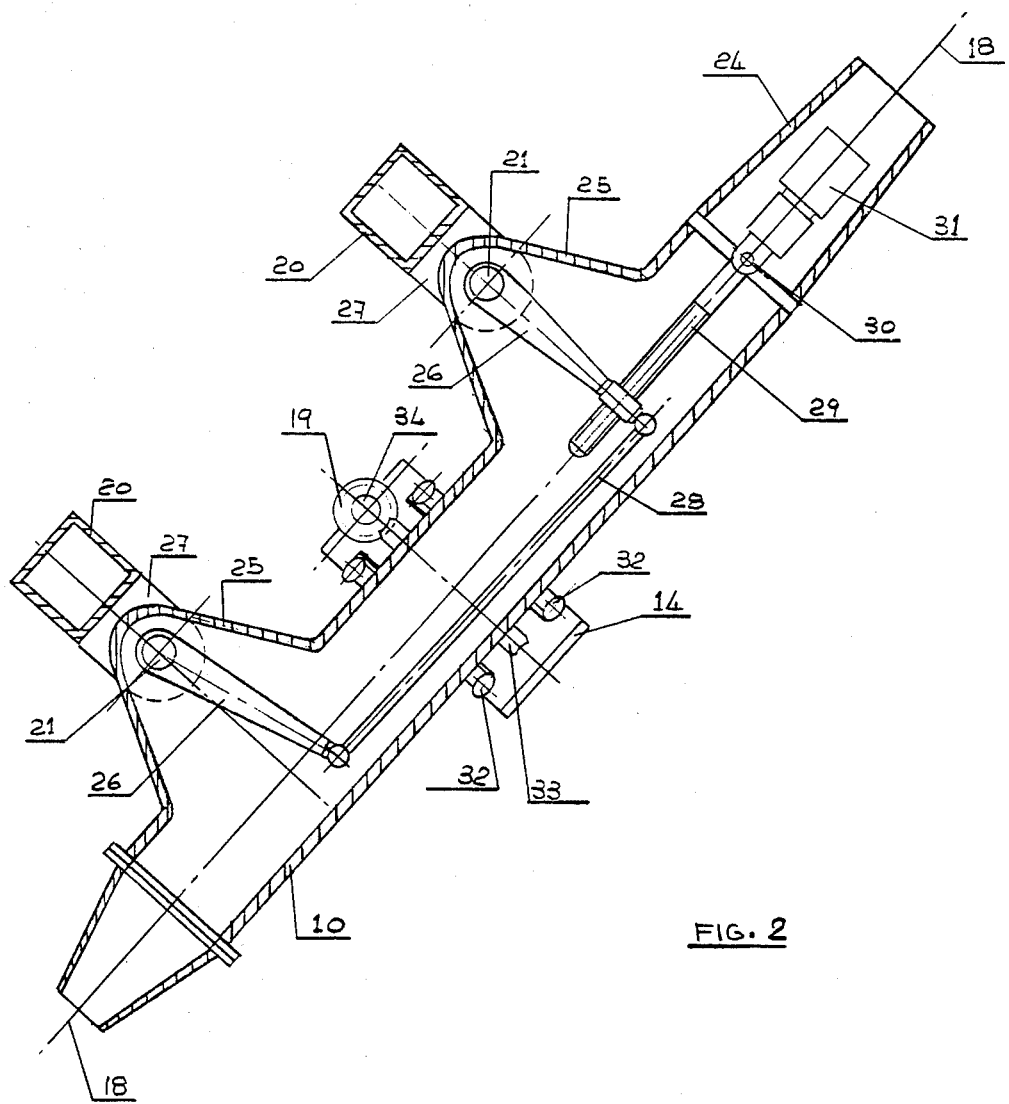
FIG. 2 is a diagrammatic longitudinal cross-section through the bearing column showing the mechanisms driving said column and the secondary structures.

FIG. 2 shows diagrammatically one of the many systems of mechanism which can be used to actuate the swinging and pitching movements of the heliostat which forms the object of this patent. In this figure, the support tube 10 is shown in longitudinal section, as are also the frames 25 which serve as support for the pitch shafts 21 and as housing for the levers 26 which are rigidly connected to said pitch shafts. The spars 20 are connected rigidly to the shafts 21 by lugs 27 which embrace on the outside of the frames 25. The levers 26 are connected together by an articulated connecting rod 28 in such a manner that the pitching movements of the spars 20 around the shafts 21 are joint.

The pitching movement is actuated by a worm 29 articulated on the tube 10 by knuckle joints 30 and driven in its turn by a motor reducer 31. The relative dimensions of the system permit a pitching movement with a total amplitude on the order of 90°.

In FIG. 2 there is also diagrammatically shown a possible system of actuating the pitching movement of the tube 10 around its axis 18. The tube 10 is pivoted the frame 14 by bearings 32. The swing position is held via a gear ring 33 firmly secured to the tube 10 and driven by a pinion 34 moved by a motor reducer 19 mounted on the frame 14.

The combined swinging and pitching movements make it possible to orient the reflective surfaces 22 in the desired sun-following positions or in protective lowered positions of the heliostat such as feathered positions facing strong winds and orientation of the mirrors towards the ground during non-operating periods.

Figure 3:
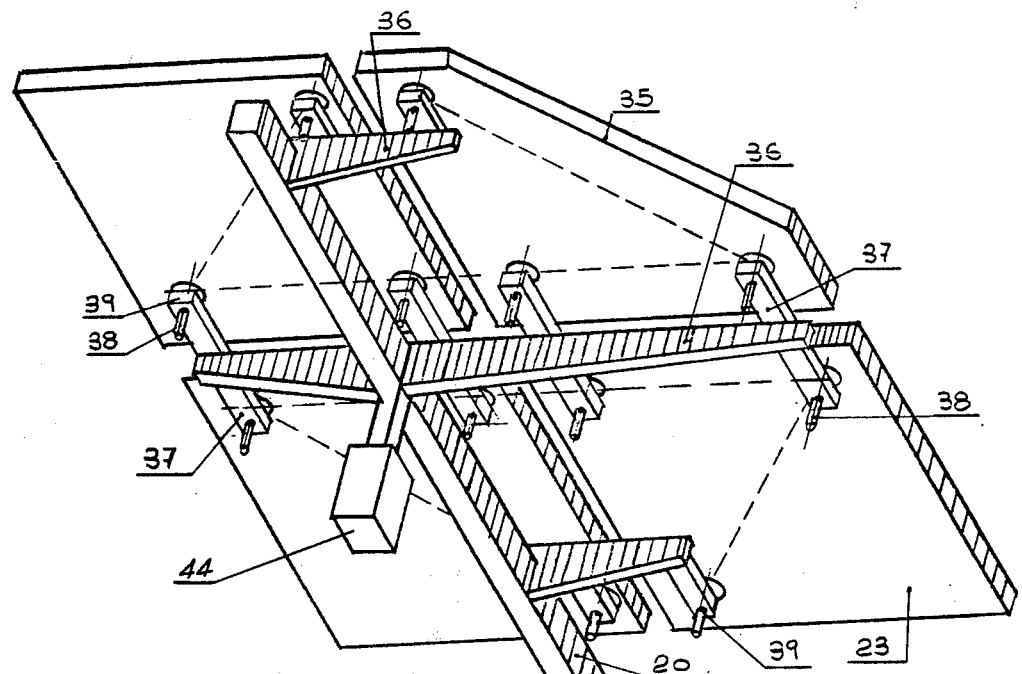
FIG. 3 is a rear perspective view of the secondary structures.

FIG. 3 shows diagrammatically the configuration and structural arrangement of one of the reflective petals 22. In the figure the reflective assembly is shown seen from its rear formed of four facets 23 which are identical except for one of them, 35, on which the outer triangular zone has been eliminated. The support structure of the assembly is formed of a spar 20, the ribs 36 and the straps 37. Each of the facets 23 is fastened to the support structure of straps at three points located at the vertices of the triangles indicated in dashed line. The fastening of the facets to the straps is effected by bolts 38 fastened to the rear face of the facets and passing through corresponding orifices in the straps. By tightening these anchoring bolts to a greater or lesser extent on these straps by nuts 39, it is possible slightly to vary the orientation of the facet with respect to the support structure and in this way make the optical axes 40 of the facets coincide at an ideal focal point.

FIG. 4 shows one possible structural solution for the reflective facets 23. The facet is formed of a support box 41 and a light rigid filler such as polystyrene foam 42 which serves as support for the reflective surface 43, which may be flat or have a certain concavity.

In order to reduce to a minimum the aerodynamic moment of the resultant of the pressures of the wind on the facets with respect to the pitch axis 21, this axis 21 is located in the plane normal to the facet which contains the center of pressures of said facet.

Furthermore in order to reduce the moment of weight of the reflector panels with respect to the pitch axis 21 use is made of counterweights 44 mounted on the structural support of the panel.

When the unit turns around the axis 18, the petals 22 never interfere with the posts 15 since the latter are in a plane perpendicular to the axis 18. Therefore there is no limitation in the magnitudes of swing around the axes 18 and 21.

In order to protect the reflective surfaces from hail, the petals can be lowered directing them towards the ground by combined turns around the axes 18 and 21.

For reasons of optical efficiency and in order to reduce the total height of the unit it is advisable to eliminate the outer corners of the reflector petals.

The lower ends of the posts 15, as well as the lower bearing support 12 of the column 10 are anchored to the ground by load distributing shoes. Since the distance between these shoes is equal to approximately the characteristic height of the heliostat, the overturning moments due to the wind produce moderate loads on the foundation, so that the said foundation can be light and low in cost.

In the case of FIG. 5, the plane structure which serves as support for the upper articulated support 14 of the main bearing column 10 is formed of a compression-resistant post 45 which is braced laterally by the tension-resistant tie rods 46. The post 45 is located approximately in the vertical plane which contains the bearing column 10 and as can be seen in the drawing, it is anchored to the ground at its lower end. The tie rods 46 which form a certain angle with the column 10 are also anchored to the ground at the bottom by means of adjustable turnbuckles 47.

Having sufficiently described the nature of the invention as well as the manner of carrying it out in practice, it is to pointed out that the arrangements indicated above are capable of modifications in detail without thereby altering its fundamental principle.

I claim:

1. A solar radiation reflector which comprises a bearing column, a plurality of secondary structures mounted on the bearing column and a series of reflecting surfaces mounted on the secondary structures, the bearing column is mounted in an inclined position with respect to the local horizontal plane, the bearing column being mounted to have the ability to swing freely around its axis, a first drive mechanism connected with the bearing column for fixing the swing position of the column in any location around its axis, the secondary structures each being articulatedly mounted to the bearing column so that each secondary structure has the ability to swing with respect to the bearing column around a respective axis of articulation, a second drive mechanism connected with the secondary structures for swinging them around the respective axes of articulation, supports for supporting the column including one support located at the lower end of the column which for being anchored directly to the ground, and a second support at an intermediate point along the column, the second support is supported by a flat structure that extends to a bottom thereof and the flat structure is anchored at the bottom to the ground and the flat structure is located in a plane substantially perpendicular to the axis of swing of the bearing column.

2. A reflector according to claim 1, wherein the flat structure is comprised of two uprights which form an angle to each other, with the vertex of the angle being toward the bearing column and the uprights being anchored to the ground at their lower ends.

3. A reflector according to claim 1, wherein the flat structure is comprised of a compression-resistant resistant post, a plurality of tension-resistant tie rods for laterally bracing the post, the post being located substantially in the vertical plane which contains the secondary support and the post being anchored to the ground at the lower end of the post; the tie rods each forming an angle with the post and being anchored to the ground at the lower ends of the tie rods by adjustable turnbuckles.

4. A reflector according to any of claims 1, 2 or 3, wherein the secondary structures are counterbalanced statically by masses located in such a manner that the gravitational moments of the weight of the secondary structures around the respective axes of articulation on the main bearing structure are minimum.

5. A reflector according to claim 1, wherein the second support of the bearing column is comprised of a ring mounted around the bearing column, bearing-race elements interposed between the ring and the bearing column, the first drive mechanism comprising the ring and a spindle borne on the ring and oriented perpendicular to the axis of the ring, a toothed ring rigidly connected to the bearing column and engaged by the spindle, and a drive connected to the spindle for moving the spindle to move the toothed ring.

6. A reflector according to claim 1, wherein the articulated mounting of the secondary structures to the bearing column comprises shafts articulating the secondary structures to the bearing column, a respective lever connected to each said shaft and the levers being oriented parallel to each other, the parallel levers are articulated at their free ends to a connecting rod, the assembly of levers bearing a nut mounted on a spindle, to which the said second drive mechanism is connected, the levers, connecting bar and spindle being housed in the inside of the bearing column.

7. A reflector according to claim 1, wherein the second support is at a point along the bearing column in the upper half of the column.

* * * * *